United States Patent [19]

Yamada et al.

[11] Patent Number: 5,767,223
[45] Date of Patent: Jun. 16, 1998

[54] WHOLLY-AROMATIC THERMOTROPIC LIQUID CRYSTAL POLYESTER AND SEALING MATERIAL FOR ELECTRIC AND ELECTRONIC PARTS

[75] Inventors: Yoshikuni Yamada, Kawasaki; Satoshi Murouchi, Yokohama; Toshitaka Kobayashi, Funabashi, all of Japan

[73] Assignee: Nippon Petrochemicals Company, Limited, Tokyo, Japan

[21] Appl. No.: 901,408

[22] Filed: Jul. 28, 1997

[30] Foreign Application Priority Data

Jul. 29, 1996 [JP] Japan .................... 8-216115

[51] Int. Cl.$^6$ .................... C08G 63/02; C08G 63/18
[52] U.S. Cl. .................... 528/193; 528/192; 528/206; 528/219; 524/401; 524/442; 524/601; 428/480
[58] Field of Search .................... 528/193, 194, 528/902, 219; 524/401, 442, 601; 428/480

[56] References Cited

U.S. PATENT DOCUMENTS

| | | | |
|---|---|---|---|
| 4,603,190 | 7/1986 | Dicke et al. | 528/193 |
| 4,632,798 | 12/1986 | Eickman et al. | 264/272.17 |
| 4,751,128 | 6/1988 | Portugall et al. | 528/193 |
| 5,037,939 | 8/1991 | Eckhardt et al. | 528/193 |
| 5,066,767 | 11/1991 | Matzner et al. | 528/193 |
| 5,097,001 | 3/1992 | Layton et al. | 528/193 |
| 5,147,967 | 9/1992 | Stern et al. | 528/193 |
| 5,204,417 | 4/1993 | Stern et al. | 525/444 |
| 5,216,091 | 6/1993 | Stern et al. | 525/444 |
| 5,278,278 | 1/1994 | Okamoto et al. | 428/190 |

*Primary Examiner*—Samuel A. Acquah
*Attorney, Agent, or Firm*—Fisher, Christen & Sabol

[57] ABSTRACT

A thermotropic liquid crystal polyester and a sealing material used for electric and electronic parts prepared from the thermotropic liquid crystal polyester, which polyester can be molded at low temperatures, while which polyester has heat resistance capable of well withstanding the process such as soldering. The thermotropic liquid crystal polyester is characterized in that it contains five kinds of specified repeating structural units in the respective ratios and it meets specific conditions of an intrinsic viscosity or the temperature of complete melting and storage elastic modulus.

6 Claims, 1 Drawing Sheet

WHOLLY-AROMATIC THERMOTROPIC LIQUID CRYSTAL POLYESTER AND SEALING MATERIAL FOR ELECTRIC AND ELECTRONIC PARTS

BACKGROUND OF THE INVENTION

(1) Field of the Invention

The present invention relates to a novel thermotropic liquid crystal polyester and a sealing material for electric and electronic parts prepared by using the above thermotropic liquid crystal polyester.

(2) Prior Art

It is generally considered that a thermotropic liquid crystal polyester prepared from p-hydroxybenzoic acid, terephthalic acid, isophthalic acid, 4,4'-dihydroxy-biphenyl and hydroquinone, can be used for melt-molding and it is excellent in fluidity and heat resistance.

In view of the characteristic properties of such a thermotropic liquid crystal polyester, for example, U.S. Pat. No. 4,632,798 discloses the sealing for electronic parts with a resin using thermotropic liquid crystal polyester containing p-hydroxybenzoic acid.

However, the above-mentioned material is not always satisfactory. For instance, the melting point of thermotropic liquid crystal polyester is usually high, so that the melted polyester at a high temperature is brought into contact with the parts to be sealed in the sealing operation. As a result, there arise such problems that the solder joining parts in electric or electronic components to be sealed is melted again, resulting in the breaking down of electric circuit, and that the sheathing resin for insulation is also melted to cause short circuit.

In this respect, when a molding temperature of a resin itself is merely lowered as a countermeasure for the above described problems, heat resistance of the resin itself is also impaired, so that when a part that is sealed with a resin is soldered to a circuit board, it sometimes occurs that the resin for sealing is deformed or melted again in the soldering work. This is not desirable.

Meanwhile, several quintuple thermotropic liquid crystal polyesters each consisting of p-hydroxybenzoic acid (HBA), 4,4'-dihydroxybiphenyl (biphenol: BP), hydroquinone (HQ), terephthalic acid (TPA), and isophthalic acid (IPA) have hitherto been proposed, although these polyesters are not particularly directed to a sealing material. These resins are disclosed in U.S. Pat. Nos. 5,278,278; 4,751,128; 5,037,939; 4,603,190; 5,097,001; 5,147,967; 5,204,417; 5,216,091; and 5,066,767.

When the thermotropic liquid crystal polyesters disclosed in the above-mentioned U.S. Pat. Nos. 5,278,278; 4,751,128; 5,037,939; 5,097,001; 5,147,967; 5,204,417; 5,216,091; and 5,066,767, are used as sealing materials, there arise problems of the break down or short circuit, because the molding temperatures of them are high. On the other hand, when the thermotropic liquid crystal polyester described in U.S. Pat. No. 4,603,190 is employed as a sealing material, the problem of break down or short circuit will scarcely occur because its molding temperature is sufficiently low. However, because the heat resistance of the resin is low, there is a possibility of remelting or deformation of the sealing resin when the thermotropic liquid crystal polyester is once used for sealing and soldering or the like operation is done.

In these circumstances, with regard to the sealing material for electric and electronic parts, the physical properties of low molding temperature and high heat resistance which are contrary to each other, must be satisfied. In this respect, the conventional quintuple thermotropic liquid crystal polyesters as described above have not been satisfactory.

As described above, it is required that a thermotropic liquid crystal polyester used as a sealing material for electric and electronic parts can be molded at a sufficiently low temperature to avoid the break down or short circuit, while the heat resistance must be high enough to withstand the subsequent work such as soldering.

BRIEF SUMMARY OF THE INVENTION

The present invention has been made in view of the problems as described above involved in the prior art. Accordingly, the object of the present invention is to provide a thermotropic liquid crystal polyester and a sealing material for electric and electronic parts which is made of the thermotropic liquid crystal polyester. The polyester is composed of raw materials represented by the above described five components and has excellent properties of a low molding temperature and high heat resistance.

As a result of a present inventors' eager study for achieving the above described object, it has been found out that a wholly aromatic thermotropic liquid crystal polyester having a specific ratio in the composition of structural units represented by p-hydroxybenzoic acid, terephthalic acid, isophthalic acid, 4,4'-dihydroxybiphenyl, and hydroquinone, and preferably meeting specific conditions in the temperature of complete melting and the rate of change in storage elastic modulus (G'), has a quite low molding temperature and excellent heat resistance, thereby accomplishing the present invention.

The first aspect of the present invention resides in a wholly aromatic thermotropic liquid crystal polyester which is characterized in that it comprises repeating structural units represented by the following general formulae [a] to [e]; and it meets the following conditions (1) to (5):

Structural Units:

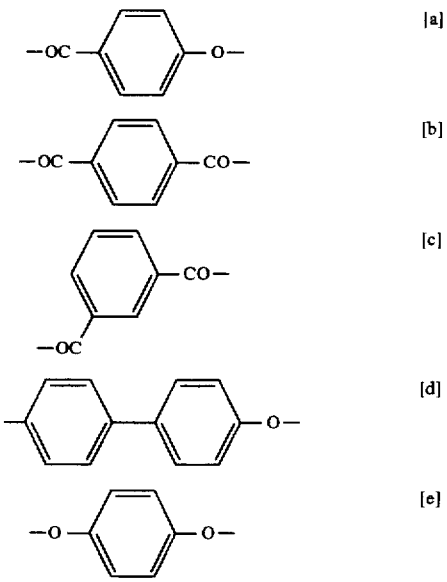

The conditions to be satisfied are as follows:

(1) The content of structural unit represented by formula [a] is 55 to 67 mol % relative to the total amount of wholly aromatic thermotropic liquid crystal polyester. The content of structural unit represented by formula [a] is hereinafter referred to as "(a)", and similar representation will be applied to other structural units [b] to [e].

(2) Both (b)+(c) and (d)+(e) are in the range from 16.5 to 22.5 mol % relative to the total amount of wholly aromatic thermotropic liquid crystal polyester, respectively.

(3) The molar ratio of (b)/(c) is in the range from 30/70 to 50/50.

(4) The molar ratio of (d)/(e) is in the range from 50/50 to 90/10.

(5) The intrinsic viscosity measured at 60° C. in pentafluorophenol is in the range from 0.3 to 10 dl/g.

The second aspect of the present invention resides in the wholly aromatic thermotropic liquid crystal polyester which is characterized in that it comprises the repeating structural units represented by the above described formulae [a] to [e], and it meets the following conditions (1) to (6).

(1) The content (a) is 55 to 67 mol % relative to the total amount of the wholly aromatic thermotropic liquid crystal polyester.

(2) Both (b)+(c) and (d)+(e) are in the range from 16.5 to 22.5 mol % relative to the total amount of the wholly aromatic thermotropic liquid crystal polyester, respectively.

(3) The molar ratio of (b)/(c) is in the range from 30/70 to 50/50.

(4) The molar ratio of (d)/(e) is in the range from 50/50 to 90/10.

(5) The temperature of complete melting which is determined by the apparent viscosity measured with a capillary rheometer is in the range from 270° to 330° C.

(6) Concerning the storage elastic modulus (G') of a flat plate prepared by press molding, the temperature showing the value which is lower by 20% than the elastic modulus at 150° C., is 260° C. or above.

The third aspect of the present invention resides in a composition which is characterized in that it contains the wholly aromatic thermotropic liquid crystal polyester according to the first or the second aspect of the present invention and 10 to 90% by weight of an inorganic filler relative to the total weight of the composition.

The fourth aspect of the present invention resides in a sealing material used for electric and electronic parts which is characterized in that it contains the wholly aromatic thermotropic liquid crystal polyester according to the first or the second aspect of the present invention and 10 to 90% by weight of an inorganic filler relative to the total weight of the composition.

BRIEF DESCRIPTION OF THE DRAWINGS

The present invention will become more fully understood from the detailed description given hereinafter and the accompanying drawings which are given by way of illustration and are not limitative of the present invention, wherein.

DETAILED DESCRIPTION OF THE INVENTION

Figure 1:
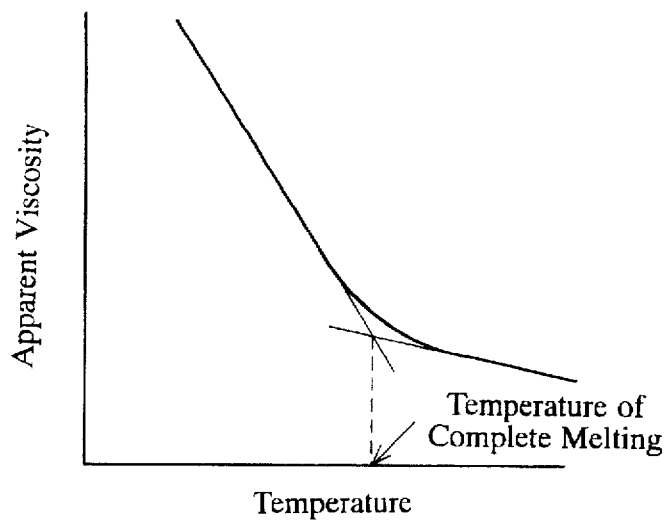
FIG. 1 is a graphical representation for the explanation of the method of determining temperature of complete melting using a curve indicating the relationship between apparent viscosity and temperature.

The present invention will be described in more detail.

The examples of monomers corresponding to the repeating structural unit of the foregoing formula [a] according to the present invention include p-hydroxybenzoic acid and its functional derivatives. The functional derivatives are exemplified by the monomers which can induce the repeating structural unit of the formula [a] by esterification, such as phenyl p-hydroxybenzoate, p-acetoxybenzoic acid, methyl p-hydroxybenzoate and methyl p-acetoxybenzoate. These monomers may be used singly or in a mixture.

The examples of monomers corresponding to the repeating structural unit represented by the above formula [b] include terephthalic acid and its functional derivatives. They are exemplified by the monomers which can induce the repeating structural unit of the formula [b] by esterification, such as diphenyl ester, dimethyl ester and diethyl ester of terephthalic acid. These monomers may be used singly or in a mixture.

The examples of monomers corresponding to the repeating structural unit represented by the above formula [c] include isophthalic acid and its functional derivatives. The functional derivatives include the monomers which can induce the repeating structural unit of the formula [c] by esterification, such as diphenyl ester, dimethyl ester and diethyl ester of isophthalic acid. These monomers may be used singly or in a mixture.

Furthermore, the examples of monomers corresponding to the repeating structural unit of the above formula [d] include 4,4'-dihydroxybiphenyl and its functional derivatives. The functional derivatives are exemplified by the monomers which can induce the repeating structural unit of the formula [d] by esterification, such as diacetoxybiphenyl. These monomers may be used singly or in a mixture.

Moreover, the examples of monomers corresponding to the repeating structural unit represented by the above formula [e] include hydroquinone and its functional derivatives. The functional derivatives are exemplified by the monomers which can induce the repeating structural unit of the formula [e] by esterification, such as diacetoxybenzene. These monomers may be used singly or in a mixture.

It is required that the content (a) of the structural unit represented by the above formula [a] is 55 to 67 mol % relative to the total amount of the wholly aromatic thermotropic liquid crystal polyester. When the content is less than 55 mol %, the resulting liquid crystal polyester exhibits insufficient heat resistance, meanwhile if the content exceeds 67 mol %, the molding temperature of the liquid crystal polyester is high, so that both the cases are not desirable.

With respect to the structural units of formulae [b] and [c], it is required that (b)+(c) are 16.5 to 22.5 mol % relative to the total amount of the wholly aromatic thermotropic liquid crystal polyester, and the molar ratio of (b)/(c) is in the range from 30/70 to 50/50. If (c) is more than 70 mol % relative to the total amount of (b)+(c), the heat resistance of the resulting polyester is insufficient, meanwhile if (c) is less than 50 mol %, the molding temperature of the polyester is too high, so that both the cases are not desirable.

With respect to the structural units represented by the above formulae [d] and [e], it is necessary, that (d)+(e) are in the range from 16.5 to 22.5 mol % relative to the total amount of the wholly aromatic thermotropic liquid crystal polyester, and the molar ratio of (d)/(e) is in the range from 50/50 to 90/10. When (d) is less than 50 mol % relative to the total amount of (d)+(e), the molding temperature of the resulting polyester is too high, meanwhile if (d) exceeds 90 mol %, the heat resistance of the polyester is too low, so that both the cases are not desirable.

Furthermore, the wholly aromatic thermotropic liquid crystal polyester having the above described composition is required to have an intrinsic viscosity within a range from 0.3 to 10 dl/g, which intrinsic viscosity is measured at 60° C. in pentafluorophenol. When the intrinsic viscosity is lower than 0.3 dl/g, the resulting polyester exhibits poor mechanical strength, meanwhile if it exceeds 10 dl/g, the moldability of polyester is poor, both of which are not desirable.

The wholly aromatic thermotropic liquid crystal polyester according to the present invention which comprises the repeating structural units of the foregoing formulae [a] to [e] and the contents of the respective repeating units which meet the relationship defined in the above described conditions (1) to (4), is desirably used as a sealing material. Furthermore, it is preferred that the resulting polyester for sealing material has a temperature of complete melting in the range from 270° to 330° C. which is determined from the apparent viscosity measured by a capillary rheometer.

In the measurement of the apparent viscosity, a capillary of 1.0 mm in diameter, 40 mm in length, and 90° in entrance angle is employed, and the apparent viscosity of a polyester is measured at a shear rate of 100 sec$^{-1}$ while heating the polyester at a constant rate of temperature rise of +4° C./min from 240° C., thereby obtaining a curve of apparent viscosity/temperature. When the thermotropic liquid crystal polyester is measured in accordance with the above described manner, the change in apparent viscosity is notable relative to temperatures in a mixed state of liquid crystal phase and crystalline phase, meanwhile the change of apparent viscosity is moderate relative to temperatures in a state where the whole polyester is in a melted state in a liquid crystal phase only (see FIG. 1). Concerning the obtained curve, the temperature corresponding to the intersection point of an approximately straight line of the region of large changes in apparent viscosity relative to temperature and an approximately straight line of a region of moderate changes in apparent viscosity relative to temperature, is determined and it is called as "temperature of complete melting".

FIG. 1 is a graphical representation for explaining a manner of determining the temperature of complete melting by using a curve indicating the relationship between apparent viscosity and temperature.

The injection molding of the wholly aromatic liquid crystal polyester can be carried out stably in the vicinity of the temperature of complete melting. When injection molding is carried out at a temperature lower than the temperature of complete melting, the problem of short shot is caused to occur, while if the temperature is excessively higher than the temperature of complete melting, foaming and deterioration of resin are caused to occur, so that stable molding operation cannot be carried out. Furthermore, it must be noted that the temperature of complete melting does not always coincide with the melting point measured by a DSC. Because the temperature of complete melting is sometimes higher by about 20° C. than the melting point measured by a DSC, it is more desirable to use the temperature of complete melting which is determined with the curve of apparent viscosity/temperature as an index for determining the injection molding temperature.

The thus measured temperature of complete melting is preferably in the range from 270° to 330° C. as described above, and more preferably within the range from 280° to 320° C. If the temperature of complete melting is higher than 330° C., there arise problems such as break down in an electric circuit as a result of remelting of a joined part with solder in electric and electronic parts to be sealed, and short circuit as a result of also remelting of a sheathing resin for insulation used inside the parts, so that this is not desirable. On the other hand, if the temperature of complete melting is lower than 270° C., the heat resistance of the resin is largely lowered and there arise problems of undesirable deformation and remelting of the sealing resin itself when the sealed parts are soldered onto a circuit board or the like.

Furthermore, it is preferable for the sealing material that, with regard to the storage elastic modulus (G') of a flat plate prepared by press molding, the temperature showing the value which is lower by 20% than the value at 150° C., is above 260° C.

It is to be noted that the storage elastic modulus is a value obtained by the measurement of dynamic visco-elasticity. As the test piece for measuring dynamic visco-elasticity, a flat plate having 10 mm width, 60 to 80 mm length, and 1 to 5 mm thickness and being prepared by press molding a sample under conditions in which the temperature is higher by 15° C. than the temperature of complete melting determined with a capillary rheometer and the pressure is 5 kg/cm$^2$ is employed. The apparatus and method for the press molding are not particularly limited so far as the press molding is operated under the above described conditions.

In the measurement of storage elastic modulus (G'), one end of the flat plate prepared by the above press molding is fixed and the other end is subjected to torsional movement on a horizontal plane at an angle of 6.28 rad to determine the storage elastic modulus (G') from the torque produced. In this case, the above described measurement is conducted while heating the flat plate at a constant rate of temperature rise of +2° C./min from 50° C. up to 300° C., thereby obtaining the curve of storage elastic modulus (G')/temperature. The value of storage elastic modulus (G') at 150° C. is determined on the resulting curve and a point on the curve which is lower by 20% than the former determined value is obtained, then the temperature corresponding to the point is obtained from the curve. The value which is lower than the former determined value at 150° C. is hereinafter referred to as "temperature of 20% lower elastic modulus". In other words, a value of 80% of the elastic modulus measured at 150° C. is indicated at this temperature. The reason why the storage elastic modulus (G') at 150° C. is utilized herein as a reference point of the temperature of 20% lower elastic modulus is as follows.

That is, the wholly aromatic liquid crystal polyester has sometimes a glass transition point in the vicinity of 100° C. Accordingly, the change in the value of storage elastic modulus (G') with temperature is very large in the vicinity of 100° C., so that the reproducibility is not good enough and the temperatures around 100° C. are not suitable as reference points. Furthermore, due to the influence of molding strain remaining in the flat plate below the glass transition point, there is a tendency that the value of storage elastic modulus (G') varies, even when the same sample is used for measurement. Thus, it is preferred that a temperature higher than the glass transition point which is not affected by the phase transition and the molding strain is utilized as a reference point in order to obtain reproducible results of measurement. For this reason, the storage elastic modulus (G') at 150° C. is adopted as the reference in the present invention.

Figure 2:
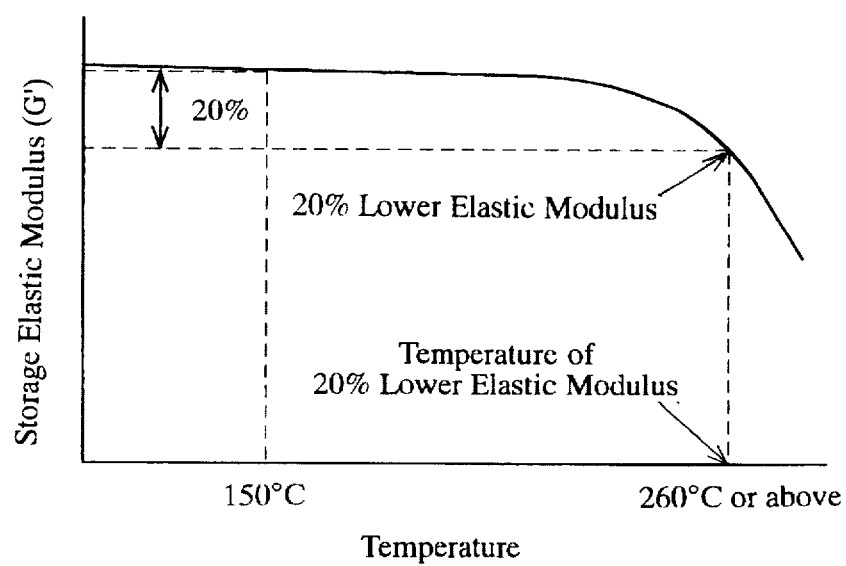
FIG. 2 is a graphical representation for explaining the method of determining the temperature which corresponds to a value lower by 20% relative to the value at 150° C. using a curve indicating the relationship between storage elastic modulus (G') and temperature.

FIG. 2 is a graphical representation for explaining a method of determining the temperature of 20% lower elastic modulus with the use of a curve indicating the relationship between the storage elastic modulus (G') and the temperatures.

The temperature of 20% lower elastic modulus is a parameter indicating the heat resistance, and the correlation with solder heat resistance of an injection-molded article is observed. In the present invention, it is preferred that the thermotropic liquid crystal polyester has a temperature of 20% lower elastic modulus of 260° C. or higher, which value is determined in accordance with the above described manner. When the temperature of 20% lower elastic modulus is below 260° C., the heat resistance of the resulting polyester decreases markedly, and there arise the deformation and remelting of the sealing resin itself in the soldering step, so that it is not desirable.

In other words, since the resin according to the present invention has a temperature of 20% lower elastic modulus determined by the above described method, of 260° C. or higher, the sealing resin itself in the parts sealed with the resin can maintain a certain degree of mechanical strength, even when a resin-sealed part is dipped into a solder bath, the bath temperature of which is usually 280° C. Accordingly, even when the resin which was used for resin-sealed parts is further heated or pressed in the soldering, it is scarcely deformed, so that the resin-sealed parts exhibit good resistance to solder. It is to be noted that when resin-sealed parts are dipped into a solder bath, the whole of the parts is not always heated up to the bath temperature. Therefore, the value of limitation of the temperature of 20% lower elastic modulus determined by the above method, is not specified to 280° C. but to 260° C.

Furthermore, the upper limit of the temperature of 20% lower elastic modulus is usually not higher than 350° C., preferably below 330° C., although it is not specifically limited.

In order to obtain a thermotropic liquid crystal polyester preferably used as a sealing material, it is important to polymerize such that the types of monomers, catalysts, polymerization conditions and the like used in the copolymerization are appropriately selected so that the intrinsic viscosity, temperature of complete melting and temperature of 20% lower elastic modulus of the resulting thermotropic liquid crystal polyester are within the above specified ranges, respectively. In other words, the types of monomers, catalysts, polymerization conditions and the like may be changed in view of these parameters.

More particularly, the wholly aromatic polyester of the present invention can be produced in accordance with the conventional polycondensation method, which is not especially limited. Typical methods include the following items of (1) to (4).

(1) A producing method from a diacylated aromatic dihydroxyl compound, an acylated aromatic hydroxy-carboxylic acid, and an aromatic dicarboxylic acid in accordance with deacetic acid polycondensation.

(2) A producing method from an aromatic dihydroxyl compound, an aromatic hydroxy-carboxylic acid, and an aromatic dicarboxylic acid as well as acetic anhydride in accordance with deacetic acid polycondensation.

(3) A producing method from an aromatic dihydroxyl compound, a diphenyl ester of aromatic hydroxy-carboxylic acid, and a phenyl ester of aromatic hydroxy-carboxylic acid in accordance with dephenol polycondensation.

(4) A producing method in which an aromatic hydroxy-carboxylic acid and an aromatic dicarboxylic acid are reacted with a desired amount of diphenyl carbonate to phenylesterify the carboxyl groups, and then an aromatic dihydroxyl compound is added thereto in accordance with dephenol polycondensation.

For instance, a reactor is fed with p-hydroxybenzoic acid, 4,4'-dihydroxybiphenyl, terephthalic acid, isophthalic acid and hydroquinone. Acetic anhydride is further added thereto to effect acetoxylation under acetic anhydride reflux. After that, the temperature is raised and deacetic acid polycondensation is carried out while distilling off acetic acid in the temperature range from 250° to 350° C., thereby obtaining polyester precursor. The time period for the polymerization may be selected in the range from 1 to several tens hours.

Typical catalysts used for the polycondensation are metallic catalysts such as magnesium acetate, stannous acetate, tetrabutyl titanate, lead acetate, sodium acetate, potassium acetate and antimony trioxide. They are particularly effective in the dephenol polycondensation.

It is desirable that the wholly aromatic polyester of the present invention is prepared in the combination of melt polymerization with solid phase polymerization in respect of any of the above described polycondensation methods. More particularly, the polymer prepared by means of polycondensation in the melt polymerization is further highly polymerized in the solid phase polymerization.

For the solid phase polymerization, a conventionally known method can be used. For example, the prepolymer of polyester prepared by melt polymerization is subjected to heat-treatment under an inert atmosphere of nitrogen or the like in the temperature range of 200° to 350° C. for 1 to 30 hours.

Furthermore, the polymerization vessel is not specifically limited. Any agitating means used for usual high viscosity reaction can be employed. For example, agitators of various shapes such as those of anchor type, multi-stage type, helical band, helical shaft and the like types, and agitating tank type polymerizers equipped with any of agitators made by modifying the above-mentioned ones may be employed. More particularly, it is desirable that the polymerizer is selected from Warner type mixer, Banbury mixer, pony mixer, muller mixer, roll mill, and those capable of continuous operation such as Ko-kneader, pug mill, gear compounder and the like.

The wholly aromatic polyester according to the present invention prepared as described above may be used singly or in combination with the other wholly aromatic polyesters.

Moreover, a fibrous, powdery or flaky organic or inorganic filler can be added to the wholly aromatic polyester of the present invention in order to improve mainly the mechanical strength.

The fibrous fillers are exemplified by inorganic fibrous materials such as glass fiber, asbestos fiber, silica fiber, silica-alumina fiber, potassium titanate fiber, and carbon or graphite fiber, and in addition, metallic fibrous materials made of aluminum, titanium, copper and the like. A typical inorganic fibrous material is glass fiber.

The powdery fillers are exemplified by carbon black, graphite; silicates such as silica, quartz powder, glass beads, milled glass fiber, glass balloon, glass powder, potassium silicate, aluminum silicate, talc, clay, diatomaceous earth, and wollastonite; and a variety of other metallic powders such as iron oxide, titanium oxide, zinc oxide, antimony trioxide, alumina, calcium sulfate, and calcium carbonate.

Furthermore, the flaky fillers are exemplified by mica, glass flake, various metallic foils and the like.

In addition to the above, the organic fillers are exemplified by the heat resistant and high strength fibers made of aromatic polyester, aromatic polyamide, polyimide and the like.

These fillers may be previously treated with a well-known binder or a surface treating agent.

In addition to the above described fillers, a variety of well-known additives such as antioxidant, heat stabilizer, extender, reinforcing agent, pigment and flame-retardant may be added in an appropriate quantity. These additives and fillers can be used singly or in combination of two or more of them.

When the inorganic filler is used, the addition quantity is in the range from 10% to 90% by weight, and preferably 80% by weight or less relative to the total amount of the composition. When more than 90% by weight of an inorganic filler is added, the mechanical strength of the resulting product is rather impaired, so that it is not desirable.

With the excellent characteristic properties of the thermotropic liquid crystal polyester of the present invention prepared as described above, it can be served for well-known ordinary melt molding method such as extrusion molding, injection molding, compression molding and blow molding, and molded articles such as fibers, films, tree-dimensional products, containers and hoses can be produced.

The strength of the thus produced molded article can be improved by heat treatment, in addition, the elastic modulus can also be raised in most cases. It is possible that this heat treatment is carried out by heating molded articles at their melting points or below in an inert atmosphere such as in nitrogen, argon, helium or air, or in an oxygen-containing atmosphere such as in the air, or under a reduced pressure condition.

The inorganic fillers to be added to the sealing material are not specifically limited so far as they are low in thermal expansion, high in thermal conductivity, and those in which substances damaging electrical properties in electric and electronic parts, are eliminated as far as possible. Preferable inorganic fillers are exemplified by spherical particles or milled particles of silica, alumina, titanium oxide, zinc oxide, titanium silicate, aluminum silicate, lithium aluminum silicate, magnesium aluminum silicate, aluminum titanate, aluminum nitride, silicon nitride, talc, mica and the like; as well as glass beads and glass fiber.

The particle diameter of filler particles, or the diameter and aspect ratio of fibrous filler to be used for the sealing material is arbitrarily selected from proper ranges to be served for use. These fillers can be used singly or in combination of two or more of them. Among the above inorganic fillers, one member or a mixture of two or more members selected from the group of silica, alumina, glass beads, glass fiber and talc, is preferable in view of both the fluidity and the heat resistance.

In order to keep the fluidity and the heat resistance of the sealing material in good conditions, it is preferred to add the filler in an amount of 10 to 90%, preferably 30 to 65% by weight to the whole of the above resin composition. When the quantity is less than 10% by weight, the coefficient of thermal expansion and the thermal conductivity are not so improved, meanwhile if it is more than 90% by weight, the fluidity and surface condition of the resin are impaired, so that it is not desirable.

The compounding for preparing the sealing material of the present invention and the sealing of electronic parts using the sealing material is carried out through various known methods. For instance, the sealing is done by injection molding the sealing material at a resin temperature of 270° to 330° C. and a mold temperature of 20° to 170° C., and the electric and electronic parts are sealed by means of, for example, insert molding.

The present invention will be described in more detail with reference to several examples.

It was found out that when the wholly aromatic polyesters prepared in the following examples and comparative examples, were measured by conventional procedure, all of them exhibited optical isomerism when they were melted.

EXAMPLE

<Method of Measurement>

Physical properties shown in the examples were measured by the following procedures.

(1) Temperature of Complete Melting

A capillary rheometer (trademark: Model 2010 made by Intesco K.K.) was used utilized. The measurement was carried out according to the above described method.

(2) Storage Elastic Modulus

A device for measuring dynamic viscoelasticity (trademark: RDS-11 made by Rheometrix K.K.) was used. The measurement was carried out in accordance with the above described method by employing a flat plate of 10 mm in width, 70 mm in length and 3 mm in thickness as a test piece.

(3) Solder Heat Resistance

Prepared thermotropic liquid crystal polyester prepared was mixed with 40% by weight of milled glass fiber and the resulting mixture was kneaded and granulated with a twine-screw extruder to obtain a molding material in pellet form. The pellets were molded using an injection molding machine at the temperature of complete melting to prepare test pieces, each of which was 50 mm in length, 10 mm in width and 1 mm in thickness. The injection molding machine was provided with an accumulator, trademark: SG-Sycap. M III, made by Sumitomo Heavy Industries, Ltd. The resulting test pieces were dipped into a solder bath at 280° C., by which the time lengths until deformation or blister (expansion due to internally produced gas) were caused to occur, were compared among the test pieces.

(4) Variation in Coil Element

Coil elements were sealed with the same molding material as the one used for the measurement of solder heat resistance by using an injection molding machine at a prescribed cylinder temperature and at a metal mold temperature of 30° C., and the resulting sealed parts were photographed by a soft x-ray projector to measure the variation in the coil element.

Example 1

A polymerization tank was provided with an anchor-type agitating element, in which the clearance between the tank wall and the agitating element was small. The polymerization tank was fed with 1238.09 g (8.96 mol) of p-hydroxybenzoic acid, 357.54 g (1.92 mol) of 4,4'-dihydroxybiphenyl, 292.39 g (1.76 mol) of terephthalic acid, 292.39 g (1.76 mol) of isophthalic acid, and 176.16 g (1.60 mol) of hydroquinone, then 1713.6 g of acetic anhydride was further added to them to carry out acetoxylation reaction at 150° C. for 3 hours under acetic anhydride reflux. Thereafter, acetic acid was distilled off while elevating the temperature at a rate of 1° C./min, and after the temperature reached 280° C., the reaction product was maintained at that temperature. The temperature was then raised up to 300° C. at a rate of 1° C./minute, and the product was maintained as it stands for 30 minutes. Furthermore, the temperature was raised up to 330° C. at a rate of 1° C./minute to maintain the product for 10 minutes. After that, the resulting polymer was taken out from an outlet port. The polymer thus taken out was subjected to size reduction with a grinding machine and its temperature was raised up to 250° C. in a time period of 120 minutes, which was followed by solid phase polymerization at 250° C. The terminal point of the solid phase polymerization was determined with the point that the apparent viscosity at the temperature of complete melting as measured by a capillary rheometer reached 200 poise. The intrinsic viscosity of the resulting polymer was 1.2 dl/g as a result of measurement with a 0.1 wt % solution of the polymer in pentafluorophenol at 60° C. Furthermore, the temperature dependency in storage elastic modulus was measured to determine the temperature of 20% lower elastic modulus, and also the solder heat resistance and the variation in a coil element were measured.

The compounding ratios of raw materials are shown in Table 1. The intrinsic viscosity, temperature of completely melting, temperature of 20% lower elastic modulus, solder heat resistance, variation of coil element and molding temperature of each of the obtained polymers are shown in Table 2.

Example 2

The same device as that used in Example 1 was fed with 1326.53 g (9.60 mol) of p-hydroxybenzoic acid, 387.34 g (2.08 mol) of 4,4'-dihydroxybiphenyl, 265.81 g (1.60 mol) of terephthalic acid, 265.81 g (1.60 mol) of isophthalic acid, and 123.31 g (1.12 mol) of hydroquinone, and then 1713.6 g of acetic anhydride was further added thereto. A polymer was obtained in the like manner as in Example 1. After that, the same measurement as that in Example 1 was done. The composition and measurement results are shown in Tables 1 and 2.

Example 3

The same device as that used in Example 1 was loaded with 1326.53 g (9.60 mol) of p-hydroxybenzoic acid, 327.75 g (1.76 mol) of 4,4'-dihydroxybiphenyl, 212.65 g (1.28 mol) of terephthalic acid, 318.97 g (1.92 mol) of isophthalic acid, and 158.54 g (1.44 mol) of hydroquinone, and then 1713.6 g of acetic anhydride was further added thereto. A polymer was prepared in the like manner as in Example 1. After that, measurement was carried out in the like manner as in Example 1. The composition and the measurement results are shown in Tables 1 and 2.

Example 4

The same device as that used in Example 1 was fed with 1414.96 g (10.24 mol) of p-hydroxybenzoic acid, 446.93 g (2.40 mol) of 4,4'-dihydroxybiphenyl, 159.48 g (0.96 mol) of terephthalic acid, 318.97 g (1.92 mol) of isophthalic acid, and 52.85 g (0.48 mol) of hydroquinone, and then 1713.6 g of acetic anhydride was further added. A polymer was obtained in the like manner as in Example 1. After that, the same measurement as that of Example 1 was done. The composition and the measurement results are shown in Tables 1 and 2.

Example 5

The same device as that used in Example 1 was fed with 1326.52 g (9.60 mol) of p-hydroxybenzoic acid, 506.51 g (2.72 mol) of 4,4'-dihydroxybiphenyl, 186.07 g (1.12 mol) of terephthalic acid, 345.55 g (2.08 mol) of isophthalic acid and 52.85 g (0.48 mol) of hydroquinone, and then 1713.6 g of acetic anhydride was further added thereto. A polymer was obtained in the like manner as in Example 1. After that, measurement was done in the same manner as in Example 1. The composition and the measurement results are shown in Tables 1 and 2.

Comparative Example 1

The same device as that used in Example 1 was fed with 1547.62 g (11.2 mol) of p-hydroxybenzoic acid, 223.45 g (1.2 mol) of 4,4'-dihydroxybiphenyl, 132.90 g (0.8 mol) of terephthalic acid, 265.81 g (1.6 mol) of isophthalic acid, and 132.12 g (1.2 mol) of hydroquinone, and then 1713.6 g of acetic anhydride was further added. A polymer was prepared in the like manner as in Example 1. After that, measurement was done in the like manner as in Example 1. The composition and the measurement results are shown in Tables 1 and 2.

Comparative Example 2

The same device as that used in Example 1 was fed with 1105.44 g (8.0 mol) of p-hydroxybenzoic acid, 372.42 g (2.0 mol) of 4,4'-dihydroxybiphenyl, 332.26 g (2.0 mol) of terephthalic acid, 332.26 g (2.0 mol) of isophthalic acid, and 220.20 g (2.0 mol) of hydroquinone, and then 1713.6 g of acetic anhydride was further added thereto. A polymer was obtained in the like manner as in Example 1. After that measurement was carried out in the like manner as in Example 1. The composition and the measurement results are shown in Tables 1 and 2.

Comparative Example 3

The same device as that used in Example 1 was fed with 1238.09 g (8.96 mol) of p-hydroxybenzoic acid, 268.16 g (1.44 mol) of 4,4'-dihydroxybiphenyl, 292.39 g (1.76 mol) of terephthalic acid, 292.39 g (1.76 mol) of isophthalic acid, and 229.01 g (2.08 mol) of hydroquinone, and then 1713.6 g of acetic anhydride was further added thereto. A polymer was obtained in the like manner as in Example 1. After that, measurement was carried out in the like manner as in Example 1. The composition and the measurement results are shown in Tables 1 and 2.

Comparative Example 4

The same device as that used in Example 1 was fed with 1238.09 g (8.96 mol) of p-hydroxybenzoic acid, 655.49 g (3.52 mol) of 4,4'-dihydroxybiphenyl, 292.39 g (1.76 mol) of terephthalic acid, and 292.39 g (1.76 mol) of isophthalic acid, then 1713.6 g of acetic anhydride was further added thereto. A polymer was obtained in the like manner as in Example 1. After that, measurement was carried out in the like manner as in Example 1. The composition and the measurement results are shown in Tables 1 and 2.

Comparative Example 5

The same device as that used in Example 1 was fed with 1326.53 g (9.60 mol) of p-hydroxybenzoic acid, 387.34 g (2.08 mol) of 4,4'-dihydroxybiphenyl, 106.32 g (0.64 mol) of terephthalic acid, 425.29 g (2.56 mol) of isophthalic acid, and 123.31 g (1.12 mol) of hydroquinone, and then 1713.6 g of acetic anhydride was further added thereto. A polymer was obtained in the like manner as in Example 1. After that, measurement was carried out in the like manner as in Example 1. The composition and the measurement results are shown in Tables 1 and 2.

Comparative Example 6

[The polymer having the same monomer composition as that in Example 1 of U.S. Pat. No. 5,278,278]

The same device as that used in Example 1 in the present invention was fed with 1326.53 g (9.60 mol.) of p-hydroxybenzoic acid, 405.48 g (2.18 mol) of 4,4'-dihydroxybiphenyl, 398.40 g (2.40 mol) of terephthalic acid, 132.80 g (0.80 mol) of isophthalic acid, and 112.20 g (1.02 mol) of hydroquinone, and then 1713.6 g of acetic anhydride was further added thereto. A polymer was obtained in the like manner as in Example 1. After that, measurement was carried out in the like manner as in Example 1. The composition and the measurement results are shown in Tables 1 and 2.

Comparative Example 7
[The polymer having the same monomer composition as that in Example 1 of U.S. Pat. No. 4,751,128]

The same device as that used in Example 1 in the present invention was fed with 948.47 g (6.87 mol) of p-hydroxybenzoic acid, 405.21 g (1.76 mol) of 4,4'-dihydroxybiphenyl, 608.70 g (3.66 mol) of terephthalic acid, 150.18 g (0.90 mol) of isophthalic acid, and 309.16 g (2.81 mol) of hydroquinone, and then 1713.6 g of acetic anhydride was further added thereto. A polymer was obtained in the like manner as in Example 1. After that, measurement was carried out in the like manner as in Example 1. The composition and the measurement results are shown in Tables 1 and 2.

Comparative Example 8
[The polymer having the same monomer composition as that in Example 1 of U.S. Pat. No. 5,037,939]

The same device as that used in Example 1 in the present invention was fed with 1015.68 g (7.36 mol) of p-hydroxybenzoic acid, 386.88 g (2.08 mol) of 4,4'-dihydroxybiphenyl, 531.20 g (3.20 mol) of terephthalic acid, 185.92 g (1.12 mol) of isophthalic acid, and 246.40 g (2.24 mol) of hydroquinone, and then 1713.6 g of acetic anhydride was further added thereto. A polymer was obtained in the like manner as in Example 1. After that, measurement was carried out in the like manner as in Example 1. The composition and the measurement results are shown in Tables 1 and 2.

Comparative Example 9
[The polymer having the same monomer composition as that in Example 13 of U.S. Pat. No. 4,603,190]

The same device as that used in Example 1 in the present invention was fed with 1190.56 g (8.62 mol) of p-hydroxybenzoic acid, 113.22 g (0.61 mol) of 4,4'-dihydroxybiphenyl, 146.19 g (0.88 mol) of terephthalic acid, 467.82 g (2.82 mol) of isophthalic acid, and 338.23 g (3.07 mol) of hydroquinone, and then 1713.6 g of acetic anhydride was further added thereto. A polymer was obtained in the like manner as in Example 1. After that, measurement was carried out in the like manner as in Example 1. The composition and the measurement results are shown in Tables 1 and 2.

TABLE 1

Composition of Polymers

| | Formula | | | | (mol %) |
|---|---|---|---|---|---|
| | [a] | [b] | [c] | [d] | [e] |
| | Name of Monomer | | | | |
| | HBA | TPA | IPA | BP | HQ |
| Example 1 | 56.0 | 11.0 | 11.0 | 12.0 | 10.0 |
| Example 2 | 60.0 | 10.0 | 10.0 | 13.0 | 7.0 |
| Example 3 | 60.0 | 8.0 | 12.0 | 11.0 | 9.0 |
| Example 4 | 64.0 | 6.0 | 12.0 | 15.0 | 3.0 |
| Example 5 | 60.0 | 7.0 | 13.0 | 17.0 | 3.0 |
| Comp. Example 1 | 70.0 | 5.0 | 10.0 | 7.5 | 7.5 |
| Comp. Example 2 | 50.0 | 12.5 | 12.5 | 12.5 | 12.5 |
| Comp. Example 3 | 56.0 | 11.0 | 11.0 | 9.0 | 13.0 |

TABLE 1-continued

Composition of Polymers

| | Formula | | | | (mol %) |
|---|---|---|---|---|---|
| | [a] | [b] | [c] | [d] | [e] |
| | Name of Monomer | | | | |
| | HBA | TPA | IPA | BP | HQ |
| Comp. Example 4 | 56.0 | 11.0 | 11.0 | 22.0 | 0.0 |
| Comp. Example 5 | 60.0 | 4.0 | 16.0 | 13.0 | 7.0 |
| Comp. Example 6 | 60.0 | 15.0 | 5.0 | 13.6 | 6.4 |
| Comp. Example 7 | 43.0 | 23.0 | 5.5 | 11.0 | 17.5 |
| Comp. Example 8 | 46.0 | 20.0 | 7.0 | 13.0 | 14.0 |
| Comp. Example 9 | 54.0 | 5.5 | 17.5 | 4.0 | 19.0 |

Notes:
HBA: p-Hydroxybenzoic acid
TPA: Terephthalic acid
IPA: Isophthalic acid
BP: 4,4'-Dihydroxybiphenyl
HQ: Hydroquinone

TABLE 2

Properties of Polymers

| | Item | | | | | |
|---|---|---|---|---|---|---|
| | Intrinsic Viscosity | Temp. of Complete Melting | Temp. of 20% lower Elastic Modulus | Solder Heat Resistance | Variation in Coil Element | Temp. of Molding |
| | Unit | | | | | |
| | (dl/g) | (°C.) | (°C.) | (sec.) | (mm) | (°C.) |
| Example 1 | 1.2 | 310 | 262 | 25 | 0.3 | 310 |
| Example 2 | 1.3 | 315 | 273 | 35 | 0.4 | 315 |
| Example 3 | 1.5 | 315 | 272 | 33 | 0.4 | 315 |
| Example 4 | 1.8 | 310 | 268 | 31 | 0.5 | 310 |
| Example 5 | 1.4 | 310 | 266 | 29 | 0.3 | 310 |
| Comp. Ex. 1 | 1.5 | 355 | 325 | >60 | 2.9 | 360, SS |
| Comp. Ex. 2 | 1.4 | 290 | 205 | 3 | 0.5 | 300 |
| Comp. Ex. 3 | 1.3 | 343 | 306 | >60 | 3.4 | 360, SS |
| Comp. Ex. 4 | 1.4 | 296 | 220 | 5 | 0.4 | 300 |
| Comp. Ex. 5 | 1.5 | 280 | 180 | 3 | 0.4 | 300 |
| Comp. Ex. 6 | 1.5 | 354 | 312 | >60 | 3.1 | 360, SS |
| Comp. Ex. 7 | 1.8 | 362 | 335 | >60 | 3.5 | 360, SS |
| Comp. Ex. 8 | 2.1 | 360 | 329 | >60 | 3.7 | 360, SS |
| Comp. Ex. 9 | 1.6 | 301 | 227 | 6 | 0.5 | 300 |

Notes:
>60: Longer than 60 seconds
SS: Short shot was caused to occur at 330° C.

When Comparative Examples 1 and 2 are compared with Examples 1 through 5 in view of the data in Tables 1 and 2, even when the ratio of terephthalic acid (TPA)/isophthalic acid (IPA) and that of biphenol (BP)/hydroquinone (HQ) are within the scope of the claim of the present invention, if the ratio of content of p-hydroxybenzoic acid (HBA) is out of the proper range, when HBA is too excess (Comparative Example 1), the temperature of 20% Lower elastic modulus is 260° C. or above, so that the solder heat resistance is satisfactory, however, the temperature of complete melting is so high that the low temperature molding is difficult, as a result, the remelting of solder is caused to occur. For this reason, the variation in coil element is very large. On the contrary, if content of HBA is too small (Comparative Example 2), the temperature of molding is low and the variation in coil element is small, however, the temperature of 20% lower elastic modulus is lower than 260° C., as a result, the solder heat resistance is impaired seriously.

When Comparative Examples 3 to 6 are compared with the Examples of the present invention, even when the ratio of the content of HBA is within the proper range, if the ratio of BP/HQ is too low (Comparative Example 3) or the ratio of TPA/IPA is too high (Comparative Example 6), the molding is difficult at low temperatures, so that the variation in coil element is very large, although the temperature of 20% lower elastic modulus and the solder heat resistance are satisfactory as in the case of Comparative Example 1. On the contrary, if either the ratio of BP/HQ is too high (Comparative Example 4) or the ratio of TPA/IPA is too low (Comparative Example 5), the heat resistance is not good, although the low temperature molding is possible and the coil is not changed so much. Therefore, some of properties cannot be meet their requirements.

Comparative Examples 6 to 9 show the results relating to the polymers having the same monomer compositions as those of Examples disclosed in U.S. Pat. Nos. 5,278,278; 4,751,128; 5,037,939; and 4,603,190, respectively. All these Examples are, however, out of the scope of claims of the present invention, and as a result, it will be understood that some properties do not meet the requirements.

On the other hand, in accordance with the results of Examples 1 to 5, when all the content of HBA, the ratio of TPA/IPA, and the ratio of BP/HQ are within proper ranges, the molding temperature is around 310° C., so that the low temperature molding is sufficiently possible and variation in coil element is also very small. In addition, the temperature of 20% lower elastic modulus is 260° C. or higher and the solder heat resistance is greatly improved as compared with some Comparative Examples in which the low temperature molding was possible.

In view of the above results, the thermotropic liquid crystal polyester of the present invention has a very low molding temperature and an excellent heat resistance, meanwhile it has also a good heat resistance, which are contrary characteristics to each other.

Since the thermotropic liquid crystal polyester of the present invention has a specific composition and specific properties, when it is used as a sealing material, the molding for sealing is can be done at low temperatures, so that the damaging of inner elements contained in electric and electronic parts can be reduced. In addition, the heat resistance can be maintained satisfactorily even in the after-processing such as soldering because the heat resistance is scarcely lowered.

What is claimed is:

1. A wholly aromatic thermotropic liquid crystal polyester which comprises repeating structural units represented by the following general formulae [a] to [e]:

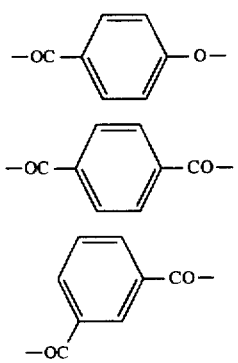

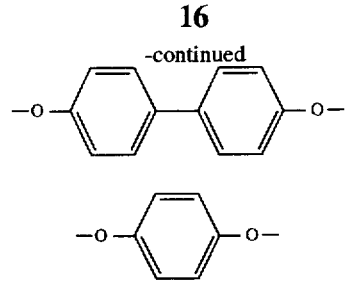

and which polyester meets the following conditions of (1) to (5):

(1) the content (mol %) of the structural unit represented by the general formula [a] is 55 to 67 mol % relative to the total amount of the polyester, the content of the structural unit [a] being hereinafter referred to as "(a)", and the similar representation being also applied to other structural units [b] to [e]);

(2) both (b)+(c) and (d)+(e) are in the range of 16.5 to 22.5 mol % relative to the total amount of the polyester, respectively;

(3) the molar ratio of (b)/(c) is in the range of 30/70 to 50/50;

(4) the molar ratio of (d)/(e) is in the range of 50/50 to 90/10; and (5) the intrinsic viscosity measured at 60° C. in pentafluorophenol is in the range of 0.3 to 10 dl/g.

2. The wholly aromatic thermotropic liquid crystal polyester which comprises repeating structural units represented by the following general formulae [a] to [e]:

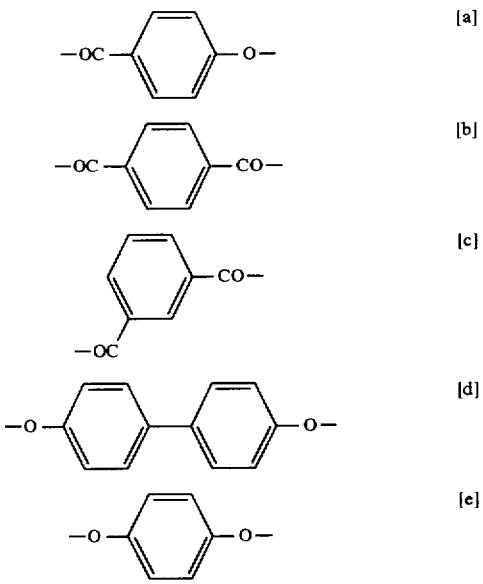

and which polyester meets the following conditions of (1) to (6):

(1) the content (a) is 55 to 67 mol % relative to the total amount of the polyester;

(2) both (b)+(c) and (d)+(e) are in the range of 16.5 to 22.5 mol % relative to the total amount of the polyester, respectively;

(3) the molar ratio of (b)/(c) is in the range of 30/70 to 50/50;

(4) the molar ratio of (d)/(e) is in the range of 50/50 to 90/10;

(5) the temperature of complete melting which is determined by the apparent viscosity measured with a capillary rheometer, is in the range of 270° to 330° C.; and (6) with regard to the storage elastic modulus (G') of a flat plate prepared by press molding, the temperature showing the value which is lower by 20% than the elastic modulus at 150° C., is 260° C. or above.

3. A composition which comprises the wholly aromatic thermotropic liquid crystal polyester as claimed in claim 1 and 10 to 90% by weight of an inorganic filler relative to the total amount of the composition.

4. A sealing material for electric and electronic parts which comprises the wholly aromatic thermotropic liquid crystal polyester as claimed in claim 1 and 10 to 90% by weight of an inorganic filler relative to the total amount of the sealing material.

5. A composition which comprises the wholly aromatic thermotropic liquid crystal polyester as claimed in claim 2 and 10 to 90% by weight of an inorganic filler relative to the total amount of the composition.

6. A sealing material for electric and electronic parts which comprises the wholly aromatic thermotropic liquid crystal polyester as claimed in claim 2 and 10 to 90% by weight of an inorganic filler relative to the total amount of the sealing material.

* * * * *

UNITED STATES PATENT AND TRADEMARK OFFICE
CERTIFICATE OF CORRECTION

PATENT NO. : 5,767,223

DATED : 6/16/98

INVENTOR(S) : Yamada et al.

It is certified that error appears in the above-identified patent and that said Letters Patent is hereby corrected as shown below:

Column 17, line 12, after "electric" insert --parts--.

Column 18, line 8, after "electric" insert --parts--.

Signed and Sealed this

Ninth Day of February, 1999

Attest:

Attesting Officer

*Acting Commissioner of Patents and Trademarks*